(12) United States Patent
Wang

(10) Patent No.: US 12,396,398 B2
(45) Date of Patent: Aug. 26, 2025

(54) PORTABLE FRUIT PICKER WITH ADJUSTABLE HEIGHT

(71) Applicant: Zhuo Xing Cheng Pin (Ningbo) Design Co., Ltd, Ningbo (CN)

(72) Inventor: Jintao Wang, Danyang (CN)

(73) Assignee: Zhuo Xing Cheng Pin (Ningbo) Design Co., Ltd., Ningbo (CN)

( * ) Notice: Subject to any disclaimer, the term of this patent is extended or adjusted under 35 U.S.C. 154(b) by 0 days.

(21) Appl. No.: 18/424,905

(22) Filed: Jan. 29, 2024

(65) Prior Publication Data

US 2025/0241244 A1 Jul. 31, 2025

(51) Int. Cl.
*A01D 46/22* (2006.01)
*A01D 46/247* (2006.01)

(52) U.S. Cl.
CPC ........... *A01D 46/247* (2013.01); *A01D 46/22* (2013.01)

(58) Field of Classification Search
CPC .... A01D 46/247; A01D 46/22; A01D 46/243; A01D 46/24; A01D 46/28; A01D 46/285; A01D 46/30
See application file for complete search history.

(56) References Cited

U.S. PATENT DOCUMENTS

| | | | | |
|---|---|---|---|---|
| 123,630 A * | 2/1872 | Hicks | .................. | A01D 46/247 56/340 |
| 497,202 A * | 5/1893 | Ohman | ................ | A01D 46/247 56/340 |
| 964,108 A * | 7/1910 | Johnson | ............... | A01D 46/247 56/340 |
| 3,397,526 A * | 8/1968 | Barrow | ................ | A01D 46/247 56/340 |
| 3,584,447 A * | 6/1971 | Wilson | ................. | A01D 46/247 56/340 |
| 3,855,765 A * | 12/1974 | Forkner | ............... | A01D 46/247 56/340 |
| 4,296,594 A * | 10/1981 | Faulconer | ............ | A01D 46/247 56/336 |
| 4,959,949 A * | 10/1990 | Wier | .................... | A01D 46/247 56/339 |
| 5,280,697 A * | 1/1994 | Miller | .................... | A01D 46/24 56/331 |

(Continued)

FOREIGN PATENT DOCUMENTS

CN 108718687 A * 11/2018 ............. A01D 46/22
CN 109451981 A * 3/2019
(Continued)

*Primary Examiner* — Adam J Behrens
(74) *Attorney, Agent, or Firm* — Jose Cherson Weissbrot

(57) ABSTRACT

A portable fruit picker with an adjustable height comprises a picking module and a container part, wherein the picking module comprises a picking part and a supporting part, and the picking part comprises a collecting part, a grabbing part and a conveying part which are engaged with the collecting part; the conveying part has elastic characteristics; the supporting part comprises a plurality of detachably connected supporting bodies; the container part is provided with a fixing part. The user can adjust the height of the supporting part independently through the detachably connected supporting bodies, and the container is provided with the fixing part, so that the user can fix the container on himself.

10 Claims, 12 Drawing Sheets

(56) References Cited

U.S. PATENT DOCUMENTS

2010/0259041 A1* 10/2010 Tsan .................. F16B 7/182
                                                    285/331
2014/0283495 A1* 9/2014 Christensen ......... A01D 46/247
                                                    56/332

FOREIGN PATENT DOCUMENTS

DE    102022200578 A1 * 11/2022
KR     20120000618 U  *  1/2012

* cited by examiner

PORTABLE FRUIT PICKER WITH ADJUSTABLE HEIGHT

TECHNICAL FIELD

The present invention relates to the field of high-altitude goods collection, in particular to a portable fruit picker with an adjustable height.

BACKGROUND

When fruit farmers are picking fruits, they usually climb to the trees to pick the high fruits, which is often accompanied by danger; And some high fruits can't be picked even if they climb to the tree. At this time, people may choose to beat them with long poles or leave them on the tree. However, if a long pole is used, the fruit may be destroyed, or it may be smashed when it falls to the ground; this will cause economic losses to fruit farmers.

In U.S. Pat. No. 31,961,972, a manual fruit picking basket is provided, which can be supported by a slender hand-held rod for continuously picking fruits from trees without a ladder or lowering the picking basket. The picking basket is basically cylindrical and includes an open upper end for receiving fruits, a lower end which defines a handle engaging socket;

the handle engaging socket is suitable for receiving one end of an elongated hand-held rod for picking fruits high on a tree, and a central part defined between the upper end and the lower end, in which a position containing fruits is defined, the open upper end is defined by an edge, the upper end has a front part and a rear part; the front part comprises a basically open edge part, and the rear part comprises a plurality of spaced, elongated fruit engaging fingers, and the fingers extend upward beyond the edge, and have a hook-shaped structure so as to at least partially surround the fruit to be picked; an outlet located under the central part and fingers, wherein the outlet is located near the handle engaging socket but higher than the socket, and its diameter is such that fruits separated from fruit trees can pass through the outlet; and a slender tubular fruit conveying device suitable for being connected to a basket near the outlet, wherein the conveying device is made of elastic fabric, and the diameter of the outlet is usually smaller than that of the fruit to be picked, but the fruit can be stretched when it passes through the outlet from the central part of the basket and enters the conveying device; in use, the picking basket is usually placed at a certain angle with the ground, and the rear part of the upper end of the basket is closest to the ground, so that the fruit separated from the tree by fingers can move down along the fingers, move along the inside of the central part of the basket, then immediately roll to the outlet device and then move down along the conveying device.

However, the height of the hand-held pole supporting the picking basket cannot be adjusted, and when users can use the picking basket to pick fruits with different heights, it will cause inconvenience if the rod body is too long or not long enough. Its tubular fruit conveying device is made of elastic fabric, which can be stretched horizontally but not longitudinally, which makes it possible for the conveying device to produce a U-shaped structure after picking from a high place to reduce the height, so that the fruits are piled up in the conveying device; the fruit container is placed at the outlet of the conveying device, but the fruit container is placed on the ground, and there is no fixation between the conveying device and the container, which is easy to make the fruit fall out of the container from the outlet of the conveying device; the fruit container is placed on the ground, and it may need to be moved constantly when picking fruits, which leads to a bad picking experience.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In order to solve the problems that the height of the supporting part rod is not adjustable and the container is inconvenient to move, the present invention provides a portable fruit picker with an adjustable height.

In order to achieve the object of height adjustment and portability, the technical solution of the present invention is as follows:

A portable fruit picker with an adjustable height includes a picking module and a container part, wherein the picking module is detachably connected with the container part; the picking module includes a picking part and a supporting part, and the picking part is detachably connected with the supporting part; the picking part includes a collecting part, a grabbing part and a conveying part which are engaged with the collecting part; the collecting part is provided with a collecting inlet end and a collecting outlet end, the conveying part is provided with an input port end and an output port end, the grabbing part is engaged with the collecting inlet end, and the input port end of the conveying part is detachably connected with the collecting outlet end of the collecting part; the conveying part has elastic characteristics, so that the conveying part can stretch longitudinally.

The supporting part includes a first supporting body and at least one second supporting body, and the first supporting body and the second supporting body are detachably connected, the first supporting body has a holding end and a first connecting end, one end of the second supporting body is engaged with the connecting end of the first supporting body, and the other end of the second supporting body is detachably connected with the picking part; the container part is provided with a first opening and a second opening, and the first opening is detachably connected with the output port end of the conveying part, the container part is provided with a fixing part, which includes a first fixing part and a second fixing part, and the second fixing part includes a first fixture and a second fixture, and the first fixture and the second fixture are detachably connected.

In this solution, the user can adjust the height of the supporting part independently according to the use scene through the first supporting body and a plurality of second supporting bodies which are detachably connected; elastic materials are sewn in the conveying part, so that the conveying part can longitudinally extend and contract, and the length of the conveying part will be correspondingly shortened when the user picks from a high place to reduce the height, so as to avoid a U-shaped structure and prevent fruits from being accumulated in the conveying part; the conveying part is detachably connected with the container part, and the container part is provided with a fixing part, so that the user can fix the container part on himself, which is convenient for the user to change the picking position at any time.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

In the drawings.

Figure 1:
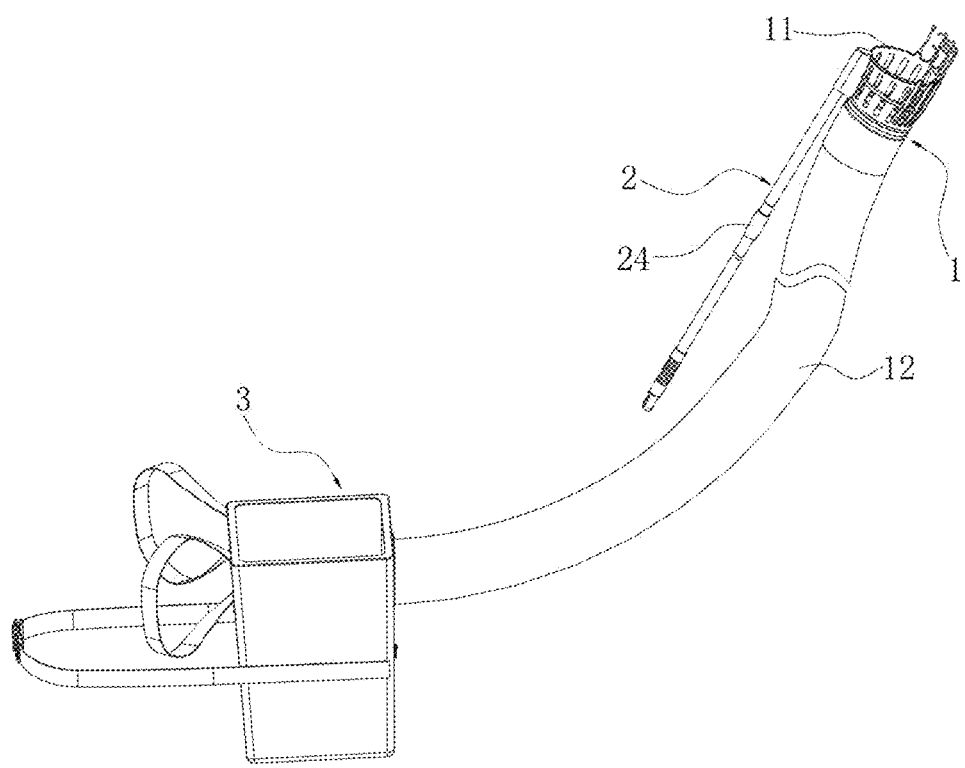
FIG. 1 is a schematic diagram of the overall structure of a fruit picker.
Figure 2:
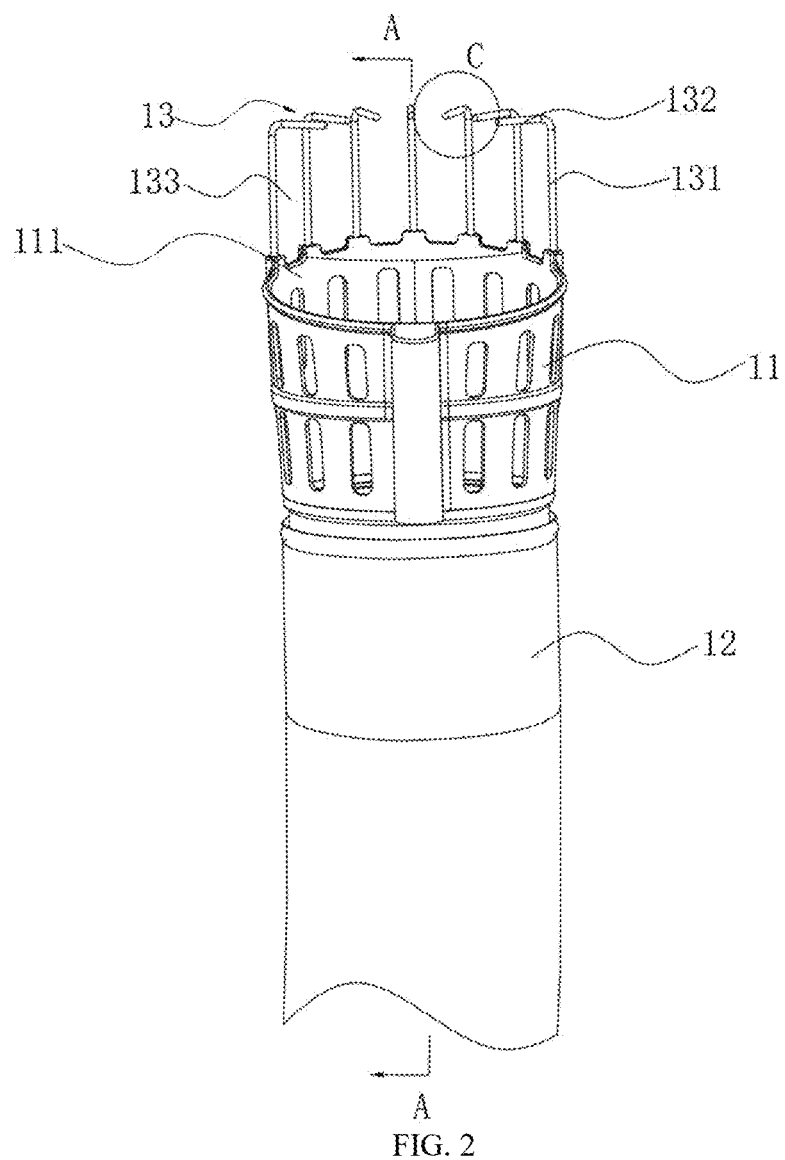
FIG. 2 is a schematic structural diagram of the picking part.

1, Picking part; 11, Collecting part; 12, Conveying part; 13. Grabbing part; 111, Collecting inlet; 112, Collecting outlet; 113, Stabilizer; 114, Fifth connecting part; 121, Input port end; 122, Output port end; 123, Buffer part; 131, Strip-shaped part; 132, Bending part; 133, Grabbing gap;

2, Supporting part; 21, First supporting body; 22, Second supporting body; 23, Connector; 24, Connecting sleeve; 211, Holding end; 212, First connecting end; 213, Connecting part; 214, First limiting inclined plane; 215, First jack; 2111, Groove; 2112, Suspension part; 2113, Hanging hole; 221, First inserting end; 222, Second connecting end; 223, Third connecting part; 224. Second limiting inclined plane; 225, Second jack; 2211. First connecting channel; 2212, Second connecting channel; 23, Connector; 231, Inserting end; 232. Connecting end; 233, First limiting part; 2311, Guide inclined plane; 2321, First connecting part; 2322, Second connecting part; 24. Connecting sleeve; 241. Second limiting part;

3, Container part; 31, First fixing part; 32, Second fixing part; 33, First opening; 34, Second opening; 35, Fourth connecting part; 36, Fixture; 37, Third opening; 38, Cover; 311, Fixing hole; 321, First fixture; 322, Second fixture; 351, Fixing groove.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As shown in FIGS. 1 to 4, a portable fruit picker with an adjustable height includes a picking module and a container part 3, wherein the picking module is detachably connected with the container part 3; the picking module comprises a picking part 1 and a supporting part 2, wherein the picking part 1 comprises a collecting part 11, and a grabbing part 13 and a conveying part 12 engaged with the collecting part 11; in this embodiment, the collecting part 11 is cylindrical, and the collecting part 11 has a collecting inlet 111 and a collecting outlet 112, and the collecting part 11 gradually contracts from the collecting inlet 111 to the collecting outlet 112, so that fruits can easily enter the conveying part 12 through the collecting part 11; stabilizers 113 are embedded at the collecting inlet 111 and the collecting outlet 112, and between the collecting inlet 111 and the collecting outlet 112; in another embodiment, the collecting part 11 may also be a curved cylindrical part with an inlet end and an outlet end.

The grabbing part 1313 is engaged at the end of the collecting inlet 111; in this embodiment, the grabbing part 13 is seven strip-shaped parts 131 with bending parts 132, and the bending angle α of the bending parts 132 is greater than or equal to 60 degrees and less than or equal to 90 degrees. In this embodiment, the bending angle α is 90 degrees. A sharp edge 1321 is formed on one side of the bending part 132, and a user can cut the fruit handle through the sharp edge 1321 when using, so that the picking process is more labor-saving; the axis of the bending part 132 intersects with the central axis of the collecting inlet 111, and the strip-shaped part 131 is equidistantly engaged with the collecting inlet 111 of the collecting part 11 through the encapsulation process, and the end of the strip-shaped part 131 engaged with the collecting inlet 111 is fixedly connected with the stabilizer 113, so that the connection between the strip-shaped part 131 and the collecting part 11 is more stable; in this embodiment, the strip-shaped part 131 is welded with the stabilizer 113, and the strip-shaped part 131 can be wound around the stabilizer 113 in addition to welding; grabbing gaps 133 are formed between the strip-shaped parts 131, and the width of the grabbing gaps 133 is smaller than that of the fruit.

In another embodiment, the strip-shaped parts 131 can be detachably engaged at the collecting inlet 111 of the collecting part 11 through threads or buckles, and the distance between the strip-shaped parts 131 can be closer. By disassembling or installing the strip-shaped parts 131, the width of the grabbing gap 133 can be adjusted, so that it can adapt to different fruit sizes.

Figure 3:
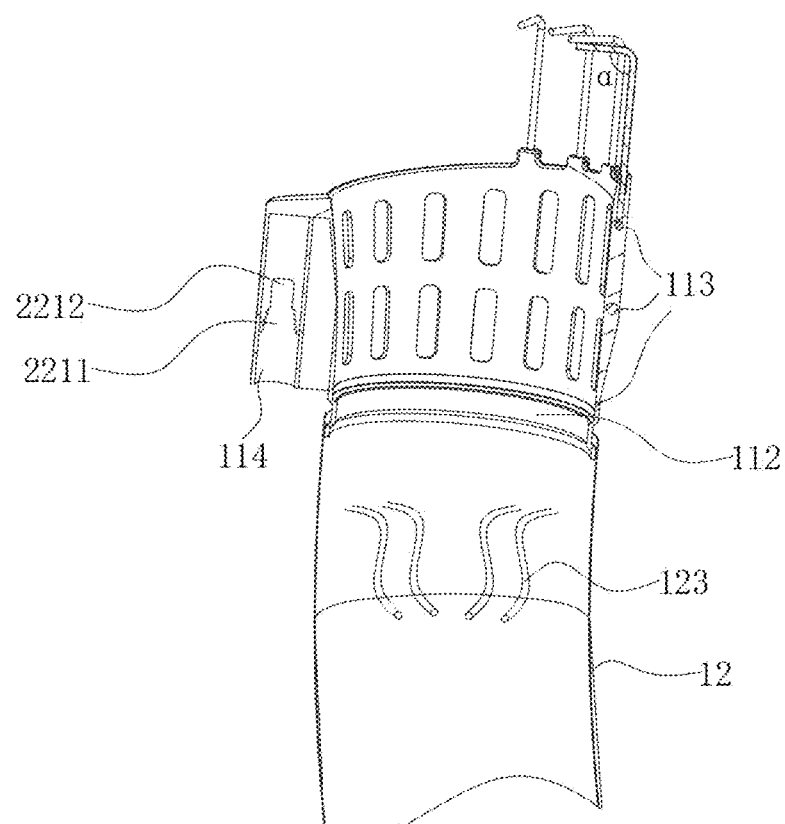
FIG. 3 is a sectional view taken at A-A in FIG. 2.
Figure 4:
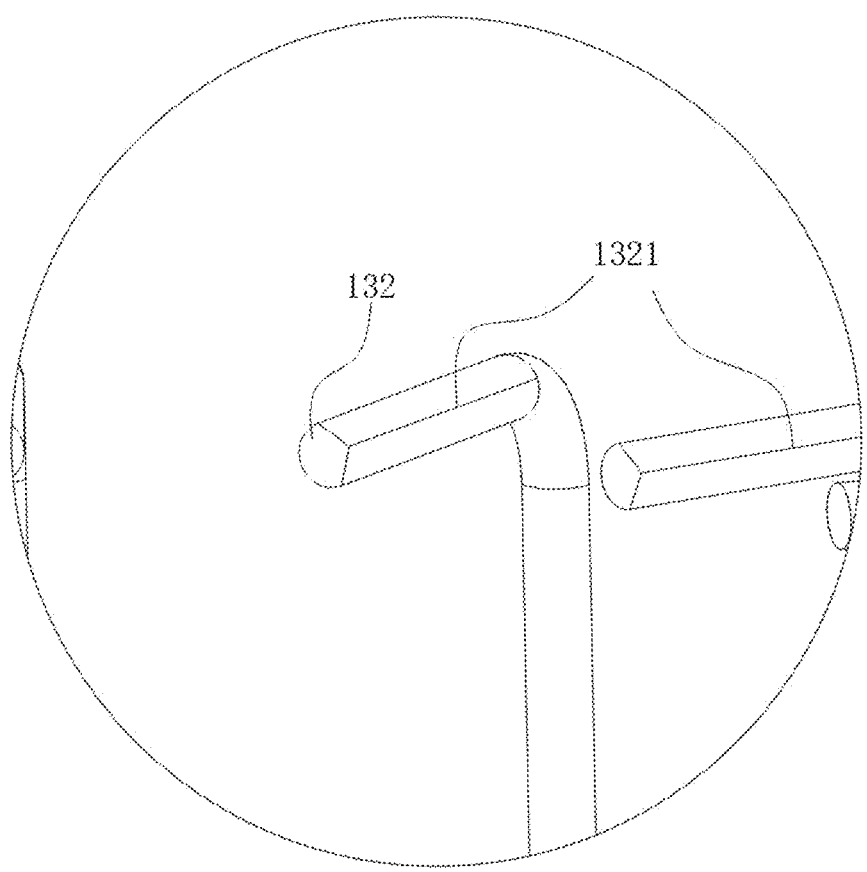
FIG. 4 is an enlarged view at c in FIG. 2.
Figure 5:
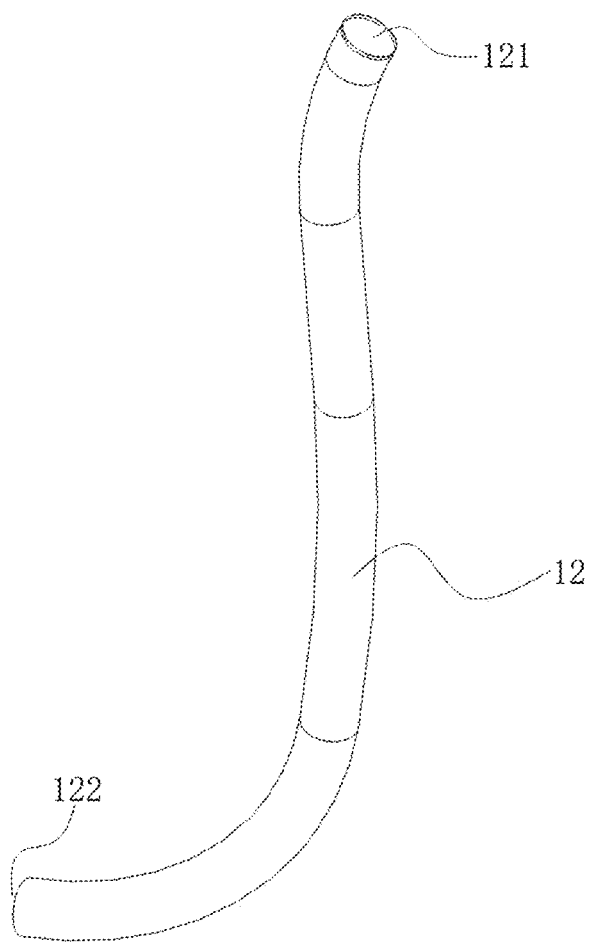
FIG. 5 is a schematic structural view of the conveying part.

As shown in FIG. 3 and FIG. 5, in this embodiment, the conveying part 12 is a fabric bag, which has an input port end 121 and an output port end 122. The input port end 121 of the conveying part 12 can be tied at the collecting outlet 112 of the collecting part 11 through a belt-like part, or can be detachably connected with the collecting outlet 112 of the collecting part 11 through a clamp; an elastic material is sewed in the conveying part 12, so that the conveying part 12 can longitudinally extend and contract, avoiding the U-shaped structure of the conveying part 12 when in use, which will otherwise cause the fruits to be accumulated in the conveying part 12; at the same time, the conveying part 12 is provided with a buffer part 123, which is a soft brush in this embodiment; when the fruit falls in the conveying part 12, the falling speed of the fruit is reduced by the soft brush to prevent the fruit from being broken during the falling process.

Figure 6:
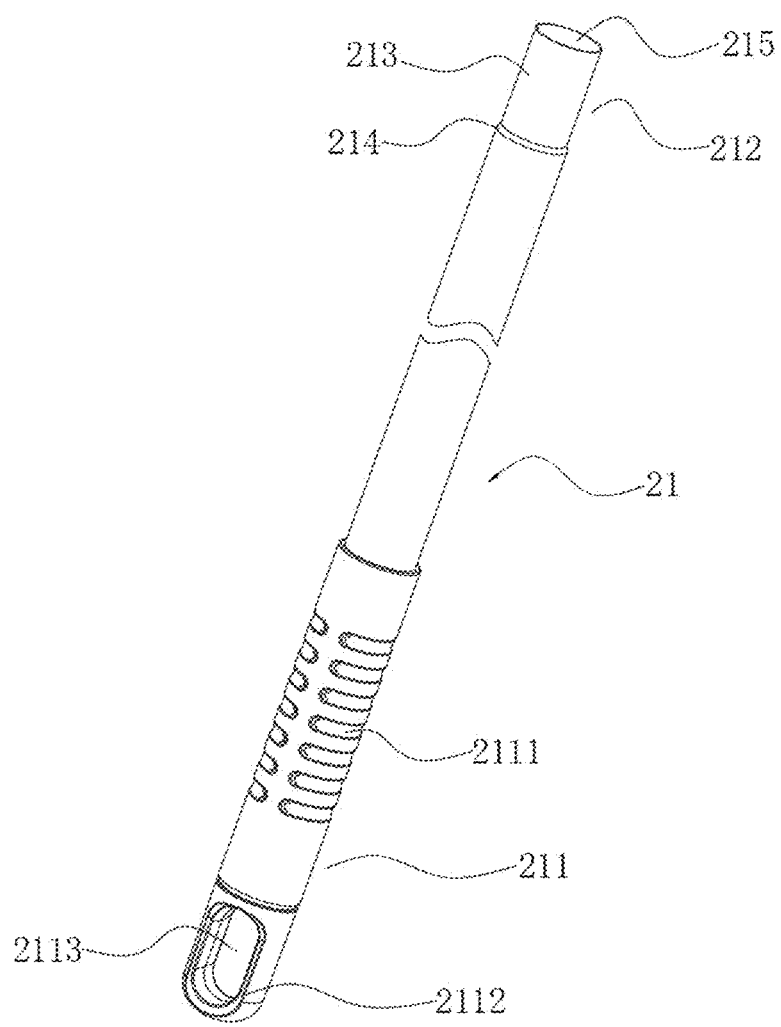
FIG. 6 is a schematic structural view of the first supporting body.

As shown in FIG. 3 and FIG. 6, in this embodiment, the collecting part 11 is provided with a fifth connecting part 114, and the fifth connecting part 114 is internally provided with a first connecting channel 2211. The first connecting channel 2211 is internally provided with an internal thread, which is detachably engaged with the supporting part 2 through the fifth connecting part 114. The supporting part 2 includes a first supporting body 21 and at least one second supporting body 22, and the first supporting body 21 has a holding end 211 and a first connecting end 212. The holding end 211 of the first supporting body 21 is provided with a plurality of grooves 2111, and the bottoms of the grooves 2111 are at a distance from the surface of the holding end 211. The holding end 211 has an uneven surface due to the grooves 2111, which increases the friction between the supporting part 2 and the palm of the user, so that the supporting part 2 is not easy to get rid of when in use, and safety accidents are avoided. A hanging part 2112 is arranged at the port of the holding end 211, and the hanging part 2112 is provided with a hanging hole 2113, so that the supporting part 2 can be hung on the wall when placed.

In this embodiment, the first connecting end 212 of the first supporting body 21 contracts inward to form a connecting part 213; a first limiting inclined plane 214 is formed at the contraction position; the port of the connecting part 213 is provided with a first jack 215, and the connector 23 is detachably connected through the first jack 215.

Figure 7:
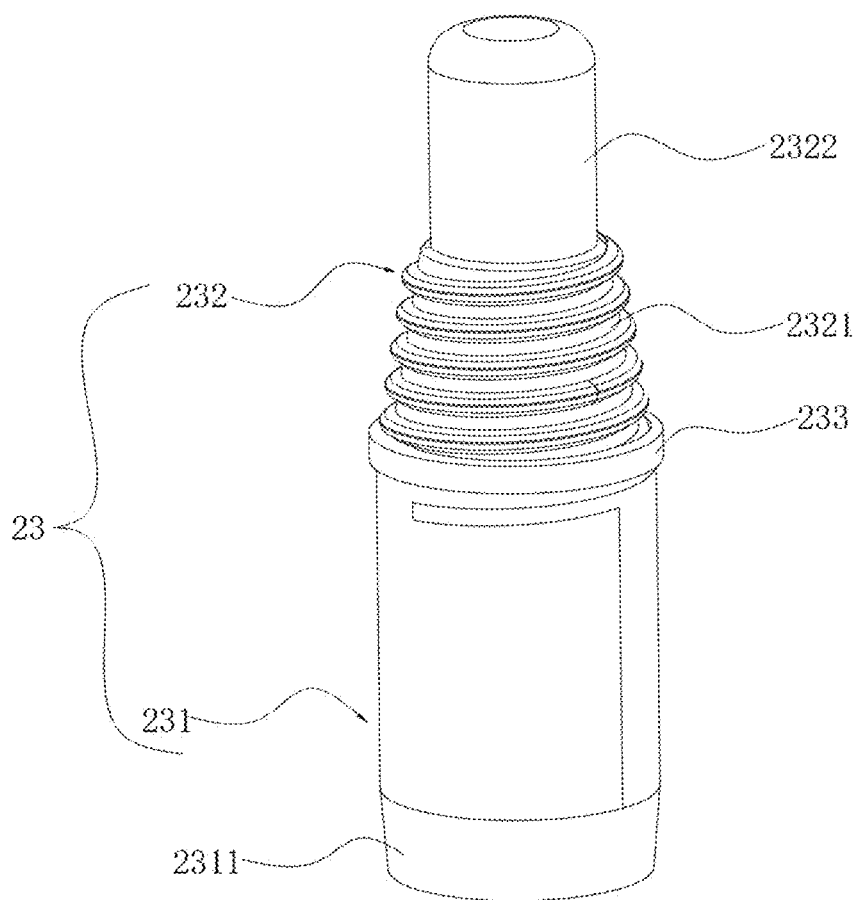
FIG. 7 is a schematic diagram of the structure of the connector.

As shown in FIG. 7, the connector 23 has an inserting end 231 and a connecting end 232; the end of the inserting end 231 contracts toward the central axis to form a guide inclined surface 2311, which makes it easier for the connector 23 to be inserted into the first jack 215; a first limiting part 233 is arranged between the inserting end 231 and the connecting end 232; through the first limiting part 233, only the inserting end 231 of the connector 23 is inserted into the first jack 215, and the connecting end 232 is left outside the first jack 215; the connecting end 232 has a first connector 2321; the first connector 2321 is tapered and the top extends horizontally forward to form a first connector 2322; the first connector 2321 is provided with external threads.

Figure 8:
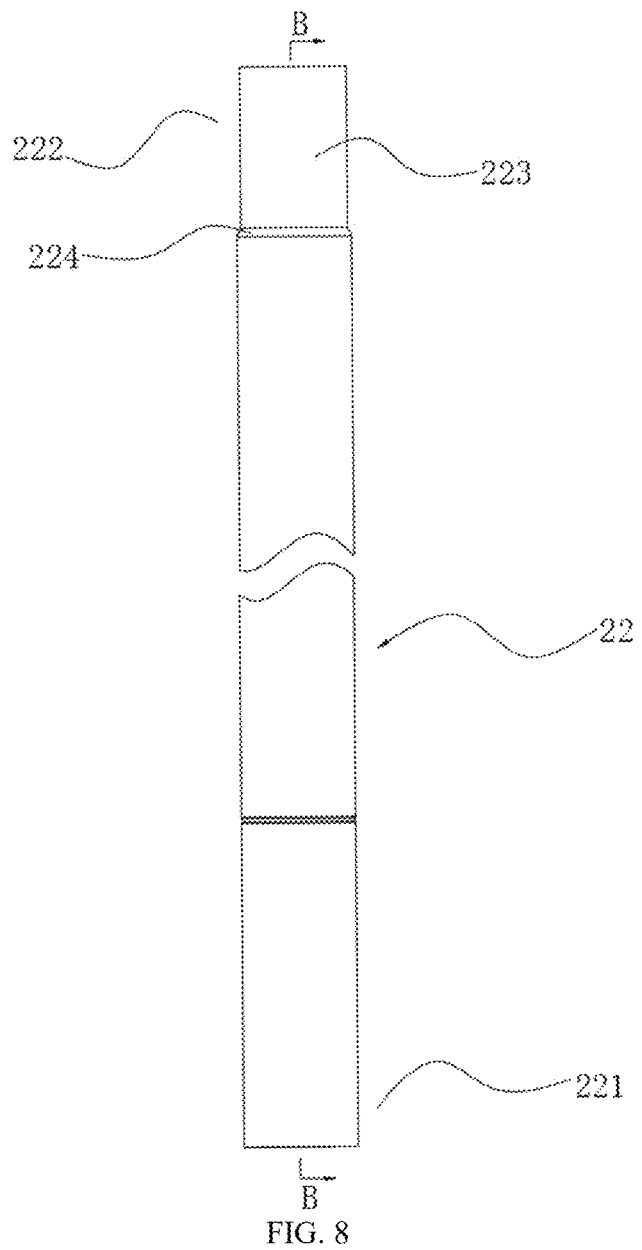
FIG. 8 is a schematic structural view of the second supporting body.
Figure 9:
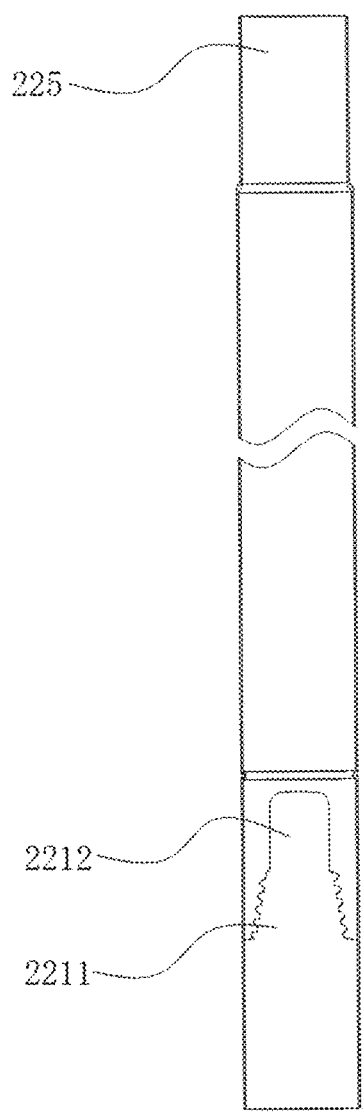
FIG. 9 is a sectional view taken at B-B in FIG. 7.

As shown in FIGS. 8 and 9, the second supporting body 22 has a first inserting end 221 and a second connecting end 222; the port of the first inserting end 221 is provided with a first connecting channel 2211 corresponding to the first connector 2321, and an internal thread is provided in the first connecting channel 2211, so that the first supporting body 21 and the second supporting body 22 are connected through threads; the first connecting channel 2211 is internally provided with a second connecting channel 2212 corresponding to the first connector 2322; when the first supporting body 21 is connected with the second supporting body 22, the connecting end 232 of the connector 23 inserted in the first supporting body 21 is matched with the first connecting channel 2211 and the second connecting channel 2212 in the second supporting body 22, so that the connection is more stable.

The second connecting end 222 contracts inward to form a third connecting part 223, a second limiting inclined plane 224 is formed at the contraction position; the port of the third connecting part 223 is provided with a second jack 225, and the connector 23 is detachably connected through the second jack 225; the fifth connecting part 114 of the collecting part 11 cooperates with the connector 23, so that the second supporting body 22 can be detachably connected with the collecting part 11.

When the user needs to lengthen the supporting part 2, the number of connected second supporting bodies 22 can be increased, and the connector 23 inserted through the third connecting part 223 of the second supporting body 22 is matched with the first inserting end 221 of another second supporting body 22, so that the second supporting bodies 22 can be detachably connected; the user can correspondingly increase the number of connected second supporting bodies 22 according to the usage scenario.

Figure 10:
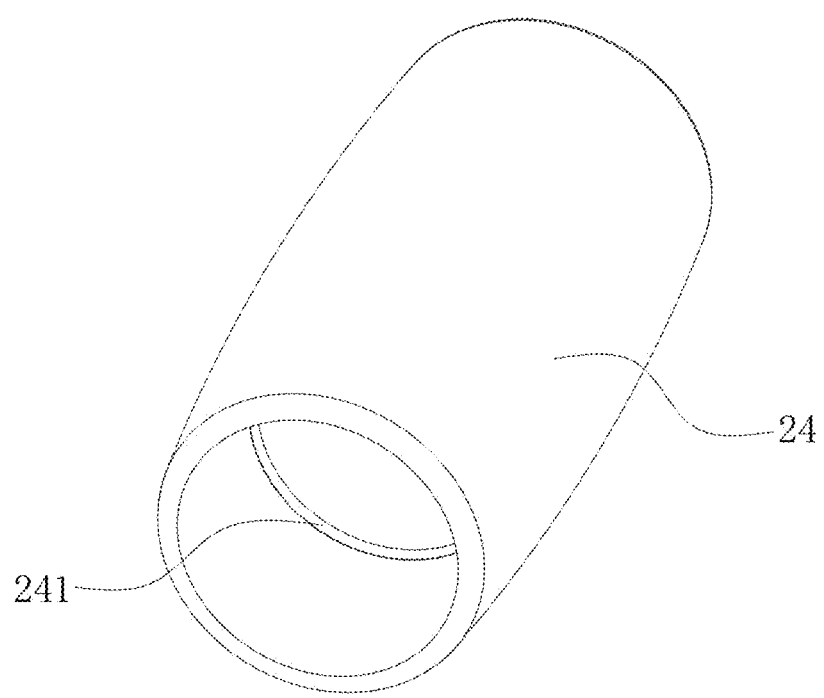
FIG. 10 is a schematic view of the structure of the connecting sleeve.

As shown in FIG. 10, a connecting sleeve 24 is sleeved at the joint of the first supporting body 21 and the second supporting body 22; a second limiting part 241 is arranged in the connecting sleeve 24. When the connecting sleeve 24 is sleeved on the first supporting body 21 or the second supporting body 22, the port of the first connecting end 212 or the port of the first inserting end 221 abuts against the second limiting part 241; through the cooperation of the second limiting part 241 with the port of the first connecting end 212 and the port of the first inserting end 221, when the first supporting body 21 is connected with the second supporting body 22, the connecting sleeve 24 is fixedly sleeved at a predetermined position and cannot move up and down; and when the number of the second supporting bodies 22 is required, the joint between the second supporting bodies 22 is also sleeved with a connecting sleeve 24; by sleeving the connecting sleeve 24, the connection between the supporting bodies is more stable, and the situation of disconnection during use is avoided.

In another embodiment, the first supporting body 21 and the second supporting body 22 can be detachably connected through a buckle structure; the second supporting body 22 and the collecting part 11 can also be detachably connected through a buckle structure; the supporting bodies can also be connected in a socket way, and a limit protrusion and a limit groove are arranged at the connection position, so that the supporting bodies are fixed at a predetermined position; the user can select the number of connected supporting bodies according to the usage scene.

Figure 11:
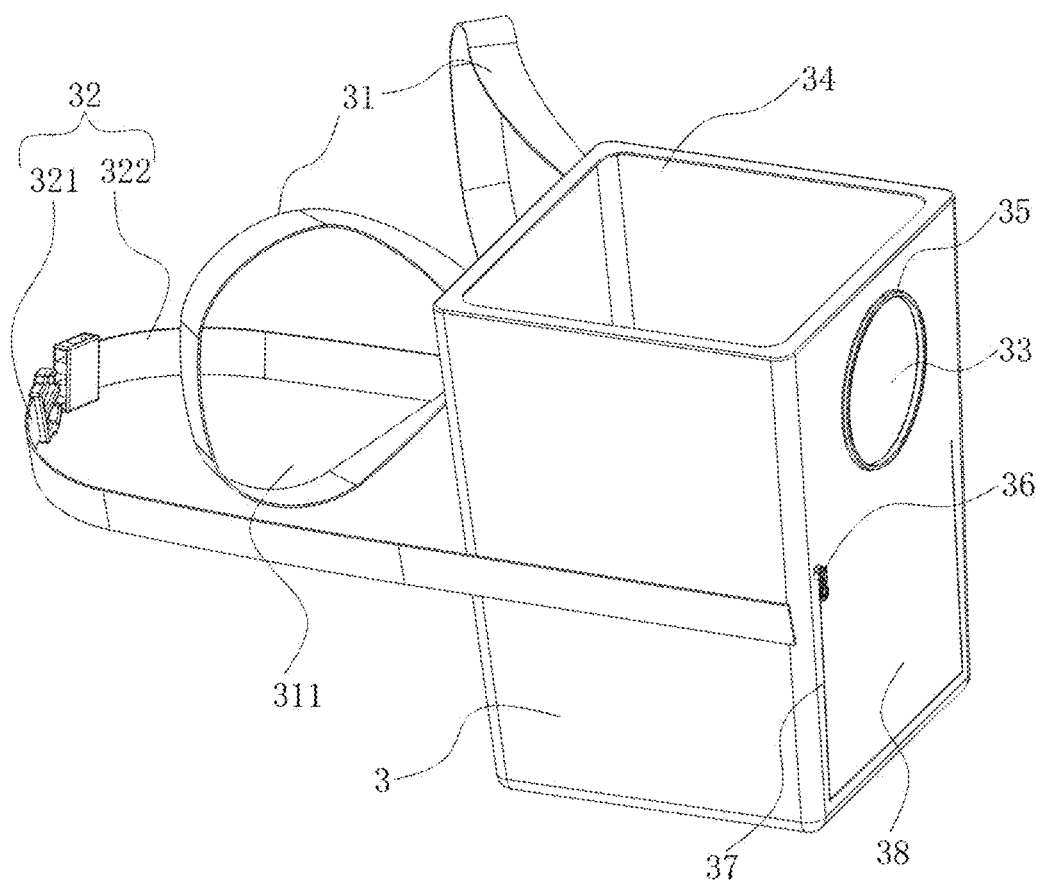
FIG. 11 is a schematic structural view of the container part.
Figure 12:
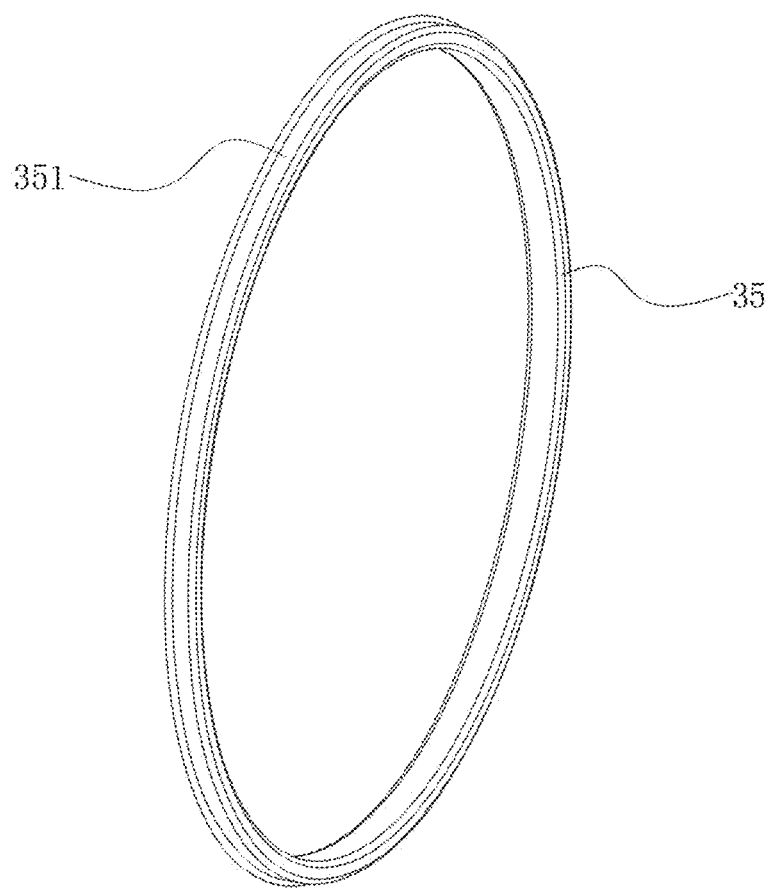
FIG. 12 is a schematic structural view of the fourth connecting part.

As shown in FIGS. 11 and 12, the container part 3 is provided with a fixing part, so that the container part 3 can be fixed on a user; the fixing part is made of materials with strong toughness, including but not limited to braids; the fixing part includes a first fixing part 31 and a second fixing part 32. In this embodiment, the first fixing part 31 is two belt-shaped parts with two ends fixed on the container wall, and a fixing hole 311 is formed between the first fixing part 31 and the container part 3, so that a user can pass his arms through the fixing holes 311 to fix the container part 3 on the user.

The second fixing part 32 includes a first fixture 321 and a second fixture 322. One ends of the first fixture 321 and the second fixture 322 are fixedly connected with the container wall, and the other ends of the first fixture 321 and the second fixture 322 are respectively connected with a male buckle and a female buckle, so that the first fixture 321 and the second fixture 322 are detachably connected through the male buckle and the female buckle. In another embodiment, the first fixture 321 and the second fixture 322 can also be detachably connected by a hook and loop; through the second fixing part 32, the container part 3 can be connected with the waist of the user; the user can more firmly carry the container part 3 on his back.

The container part 3 is provided with a first opening 33 and a second opening 34. In this embodiment, the first opening 33 is located above the side wall of the container part 3, and a fourth connecting part 35 is arranged at the first opening 33. The fourth connecting part 35 can be arranged on the outer wall or the inner wall of the container part 3.

In this embodiment, the periphery of the fourth connecting part 35 is provided with a fixing groove 351, and the output port end 122 can be fixed in the fixing groove 351 on the fourth connecting part 35 through a belt-like member, so that the conveying part 12 can be detachably connected with the container part 3; alternatively, the output port end 122 can be fixed to the fourth connecting part 35 by the cooperation between the clamp and the fixing groove 351.

In another embodiment, connectors can be respectively engaged at the output port end 122 and the first opening 33, and the detachable connection between the conveying part 12 and the container part 3 can be realized through the cooperation of the connectors. The connector can be a zipper structure or a part with a snap fit.

In this embodiment, the second opening 34 is located at the top of the container part 3. When the user carries the container part 3 on his back, he can observe whether the container is full or not through the second opening 34. When the picked fruit falls on the ground, it is convenient for users to put the fruit directly into the container part 3.

In another embodiment, the first opening 33 can be arranged at the top of the container part 3, and the output port end 122 can be detachably connected at the first opening 33 through the fourth connecting part 35.

In this embodiment, the container part 3 is provided with a third opening 37 below the side wall of the container, and a cover 38 is connected to the third opening 37 through a fixture 36, and the opening and closing of the third opening 37 can be controlled through the fixture 36; in this embodiment, the fixture 36 has a zipper structure; in another embodiment, the fixture 36 can also be a buckle structure or a hook and loop.

In another embodiment, the third opening 37 can be located at the bottom of the container, and the bottom wall of the container is connected through the fixture 36, and the opening and closing of the third opening 37 can be controlled through the fixture 36.

A method for picking fruits by using a device includes the following steps:

providing the device, which includes:
a picking module and a container part 3, wherein the picking module is detachably connected with the container part 3; the picking module comprises a picking part 1 and a supporting part 2, and the picking part 1 is detachably connected with the supporting part 2; the picking part 1 comprises a collecting part 11, a grabbing part 13 and a conveying part 12 which are engaged with the collecting part 11; the collecting part 11 is provided with a collecting inlet 111 end and a collecting outlet 112 end, the conveying part 12 is provided with an input port end 121 and an output port end 122, the grabbing part 13 is engaged at the collecting inlet 111 end, and the input port end 121 of the conveying part 12 is detachably connected with the collecting outlet 112 of the collecting part 11; the supporting part 2 comprises a first supporting body 21 and at least one second supporting body 22, and the first supporting body 21 and the second supporting body 22 are detachably connected; the first supporting body 21 has a holding end 211 and a first connecting end 212, one end of the second supporting body 22 is engaged with the connecting end 232 of the first supporting body 21, and the other end of the second supporting body 22 detachably connected with the picking part 1; the container part 3 is provided with a first opening 33 and a second opening 34, and the first opening 33 is detachably connected with the output port end 122 of the conveying part 12;

the device is used for picking fruits; the fruits are grabbed by the grabbing part 13, and the fruit handle passes through the grabbing gap 133, so that the fruit is below the bending part 132 of the strip-shaped part 131; because the width of the fruit is larger than the grabbing gap 133, the fruit will be stuck below the bending part 132, and at this time, the user provides a downward force to make the fruit fall off the fruit handle; fruits enter the collecting part 11 from the inlet end of the collecting part 11 and into the conveying part 12 through the outlet end of the collecting part 11, and the fruits in the conveying part 12 enter the container part from the output port end 122 under the action of gravity.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims. Conditional language used herein, such as, among others, "can," "could." "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A portable fruit picker with an adjustable height, comprising a picking module and a container part (3), wherein said picking module is detachably connected with said container part (3); and
    wherein said picking module comprises a picking part (1) and a supporting part (2), and said picking part (1) is detachably connected with said supporting part (2); and
    wherein, said picking part (1) comprises a collecting part (11), a grabbing part (13) and a conveying part (12) which are engaged with said collecting part (11); and
    wherein, said collecting part (11) is provided with a collecting inlet (111) end and a collecting outlet (112) end, said conveying part (12) is provided with an input port end (121) and an output port end (122), said grabbing part (13) is engaged at said collecting inlet (111) end, and said input port end (121) of said conveying part (12) is detachably connected with said collecting outlet (112) of said collecting part (11); and
    wherein, said supporting part (2) comprises a first supporting body (21) and at least one second supporting body (22), and said first supporting body (21) and said second supporting body (22) are detachably connected; and
    wherein, said first supporting body (21) has a holding end (211) and a first connecting end (212), one end of said second supporting body (22) is engaged with said first connecting end (232) of said first supporting body (21), and an opposite end of said second supporting body (22) detachably connected with said picking part (1); and
    wherein said second supporting body (22) has a second connecting end (222) and a first inserting end (221); and said second connecting end (222) contracts inward to form a third connecting part (223); and a second limiting inclined plane (224) is formed at a contraction position; and
    wherein a connecting sleeve (24) is sleeved at a joint of said first supporting body (21) and said second supporting body (22); and a second limiting part (241) is arranged in said connecting sleeve (24), so that said connecting sleeve (24) is fixedly sleeved at a joint of said first supporting body (21) and said second supporting body (22); and
    wherein said container part (3) is provided with a first opening (33) and a second opening (34), and said first opening (33) is detachably connected with said output port end (122) of said conveying part (12).

2. The portable fruit picker with an adjustable height according to claim 1, wherein said conveying part (12) has an elastic feature configured to longitudinally extend and contract, said conveying part (12); and a buffer part (123) is arranged in said conveying part (12) and configured such, that fruits pass through said conveying part (12) at a slow speed.

3. The portable fruit picker with an adjustable height according to claim 2, wherein said first connecting end (212) of said first supporting body (21) contracts inward to form a connecting part (213); and a first limiting inclined plane (214) is formed at a contraction position.

4. The portable fruit picker with an adjustable height according to claim 3, wherein said holding end (211) of said first supporting body (21) is provided with a plurality of grooves (2111), so that said holding end (211) has an uneven surface; and said connecting part (213) is detachably connected with a connector (23).

5. The portable fruit picker with an adjustable height according to claim 4, wherein said connector (23) has an inserting end (231) and a connecting end (232); and an end of said inserting end (231) contracts towards central axis to form a guide inclined plane (2311); and a first limiting part (233) is arranged between said inserting end (231) and said first connecting end (212).

6. The portable fruit picker with an adjustable height according to claim 5, wherein said connecting end (232) has a first connecting part (2321); and said first connecting part (2321) is tapered, and a top thereof horizontally extends forward to form a second connecting part (2322); and said first connecting part (2321) is provided with an external thread.

7. The portable fruit picker with an adjustable height according to claim 1, wherein a port of said first inserting end (221) is provided with a first connecting channel (2211)

corresponding to a first connecting part (2321), and a second connecting channel (2212) corresponding to a second connecting part (2322) is arranged in said first connecting channel (2211); and said first connecting channel (2211) is internally provided with an internal thread, so that said first supporting body (21) and said second supporting body (22) are connected through threads.

8. The portable fruit picker with an adjustable height according to claim 1, wherein said container part (3) is provided with a fixing part, which comprises a first fixing part (31) and a second fixing part (32), and said second fixing part (32) comprises a first fixture (321) and a second fixture (322); and said first fixture (321) and said second fixture (322) are detachably connected.

9. The portable fruit picker with an adjustable height according to claim 8, wherein said container part (3) is provided with a third opening (37), and said third opening (37) is connected with a cover body (38) through a fixture (36), and opening and closing of said third opening (37) is configured to be controlled through said fixture (36).

10. The portable fruit picker with an adjustable height according to claim 8, wherein said first opening (33) is provided with a fourth connecting part (35), and said output port end (122) is detachably connected with said first opening (33) through said fourth connecting part (35).

* * * * *